United States Patent [19]

Tandler et al.

[11] Patent Number: 4,841,107
[45] Date of Patent: Jun. 20, 1989

[54] DEVICE FOR INDICATING THE FILLING LEVEL IN A FLUID RESERVOIR

[75] Inventors: Peter Tandler, Kronberg/Ts.; Rudolf Cezanne, Hofheim/Ts., both of Fed. Rep. of Germany

[73] Assignee: Alfred Teves GmbH, Frankfurt am Main, Fed. Rep. of Germany

[21] Appl. No.: 189,857

[22] Filed: May 3, 1988

[30] Foreign Application Priority Data

May 14, 1987 [DE] Fed. Rep. of Germany ....... 3716135

[51] Int. Cl.$^4$ ............................................. H01H 35/18
[52] U.S. Cl. ................................ 200/84 C; 340/450.1; 340/624; 73/322.5
[58] Field of Search ............... 340/52 C, 59, 623, 624; 335/205; 73/307, 308, 319, 322.5; 307/118; 200/61.2, 84 C

[56] References Cited

U.S. PATENT DOCUMENTS

| 3,680,044 | 7/1972 | Tsubouchi | 200/84 C |
| 3,924,086 | 12/1975 | Ochsner | 335/205 |
| 4,020,481 | 4/1977 | Nakagawa | 200/84 C |
| 4,091,250 | 5/1978 | Siiberg | 200/84 C |
| 4,356,729 | 11/1982 | Kubota | 200/84 C |
| 4,443,656 | 4/1984 | Linse | 361/419 |
| 4,613,925 | 9/1986 | Mohri | 361/417 |

FOREIGN PATENT DOCUMENTS

| 1190688 | 4/1965 | Fed. Rep. of Germany . |
| 7320310 | 4/1973 | Fed. Rep. of Germany . |
| 7830881 | 4/1979 | Fed. Rep. of Germany . |
| 3021434 | 2/1985 | Fed. Rep. of Germany . |
| 3524281 | 1/1987 | Fed. Rep. of Germany . |

Primary Examiner—Gerald P. Tolin
Attorney, Agent, or Firm—James B. Raden

[57] ABSTRACT

Disclosed is a device for indicating the filling level in a fluid reservoir of a hydraulic brake system, wherein a magnet is arranged in a radial recess of the float with the side walls of the recess being provided with retaining means for securing the magnet in its installed position.

5 Claims, 2 Drawing Sheets

DEVICE FOR INDICATING THE FILLING LEVEL IN A FLUID RESERVOIR

BACKGROUND OF THE INVENTION

The present invention relates to a device for indicating the filling level in a fluid reservoir, and in particular a fluid reservoir in a vehicular hydraulic brake system, of the type having a guide tube extending into the fluid reservoir, alongside of which guide tube a float is displaceably arranged. The float includes at least one magnet by means of which at least one reed switch arranged inside the guide tube is actuatable when the float reaches a predetermined position. The reed switch is connected by electric wires protruding from the interior of the guide tube to plug-and-socket connector contacts arranged in a cap.

A device of this kind is described in the German patent application No. P 35 24 281 of the applicant in connection with a fluid reservoir for a hydraulic brake system. The float for indicating the filling level in that device requires a complicated production technique and is considered less advantageous. The float is made of a thermoplastic plastic material and is provided with at least one axial circular indentation formed in the float's end face. The diameter of the indentation corresponds with that of a ring-shaped permanent magnet which is accommodated therein. In order to secure the permanent magnet in its installed position during the assembly and subsequent operation, the outer rim of the indentation must be sealed while the float is being heated which increases production costs of that fluid reservoir considerably.

SUMMARY OF THE INVENTION

Based on the state of the art, the present invention has as its object to provide for an improved device for indicating the filling level of a fluid reservoir which can be produced by simple means at considerable reduction in production and assembly costs without impairing its function or compromising safety.

According to the invention, this object is achieved by providing for the magnet to be arranged in a radial recess in the float with the side walls of the recess being provided with retaining means for securing the magnet in its installed position.

According to an advantageous feature of the invention the retaining means are shaped in the form of elastically deformable snap-in projections formed at the side walls of the recess. This feature provides for particularly effective protection against falling out of the magnet, which protection can be achieved at low costs.

According to another advantageous feature of the present invention, the float is provided with a second radial recess opposite the first recess. Advantageously it is possible in a particularly simple manner to achieve an exact horizontal floating position of the float.

Further advantageous and features of the present invention will become apparent from the following Detailed Description of the Preferred Embodiment.

BRIEF DESCRIPTION OF THE DRAWING

The present invention will be described in more detail in the following by means of an embodiment illustrated in the accompanying drawing wherein.

DETAILED DESCRIPTION OF THE DRAWING

Figure 1:
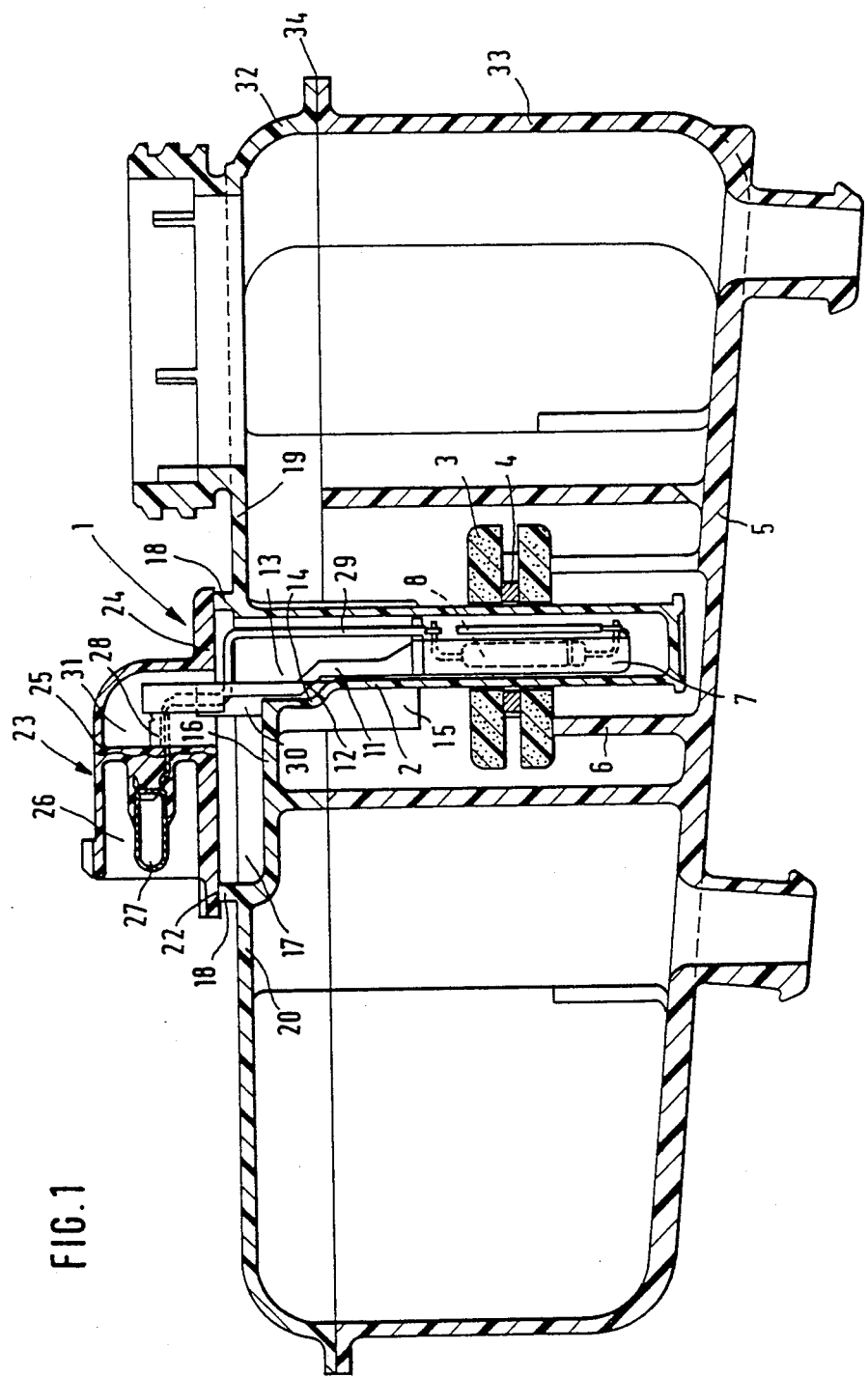
FIG. 1 is a longitudinal cross-sectional view through a device according to the invention for indicating the filling level in a fluid reservoir.

Shown in FIG. 1 is a fluid reservoir 1 for holding a hydraulic fluid, preferably a brake fluid, for attachment to a master cylinder of a vehicular brake system, which master cylinder is not illustrated in the drawing. The fluid reservoir 1 has a guide tube 2 extending into its interior. The guide tube is closed as its end directed toward the interior of the reservoir. Alongside the guide tube 2, which preferably has a circular cross-section, there is displaceably arranged a float 3 which is, for example, shaped in the form of a ring. The float 3 carries an annular magnet 4. A tube socket 6 extends upwardly from the bottom 5 of the fluid reservoir 1 and co-axially partly surrounds the guide tube 2. The tube socket 6 functions as a stop for the float 3. This stop determines the lowest position of the float 3 in the fluid reservoir 1 and prevents the float 3 from leaving the guide tube 2.

Inside the guide tube 2, there is a support 7 attached to which is a reed switch 8. A lug 11 is fastened at the support 7, which lug extends parallel to the longitudinal axis of the guide tube 2 and protrudes into an inner slit 13 in a radial projection 14 on the guide tube 2. The guide tube 2 is provided with a plurality of ribs 15 arranged on its surface in a symmetrically staggered manner which form the upper stop for the float 3.

At its upper end, the guide tube 2 forms a bottom 16 of a shallow hollow space 17, the side walls 18 of which are connected with the walls 19 and 20 of the fluid reservoir 1. The side walls 18 project a slight distance from the walls 19, 20 of the fluid reservoir 1 and form with their upper rims 22 stops for a cap 23 which comprises a flat base plate 24 extending upwardly from which is a plug-and-socket connector housing 25. The plug-and-socket connector housing 25 is provided with a recess 26 protruding into which is a contact pin 27 or a knife contact of a plug-and-socket connector which is with one end inserted into the plug-and-socket connector housing 25 so as to be gas-tight and/or fluid-tight. The end 28 of each of, for example, two contact pins 27, which end is opposite to the recess 26, is connected with the end of an electric wire 29. The other ends of the electric wire 29 are connected to the reed switch 8. If preferred the wires 29 can also be arranged in a cable.

Two projections 30 on opposite sides of the slit 13 protrude into the hollow space 17. Preferably, the projections are not higher than the side walls 18. The lug 11 extends into the chamber between the projections 30. A recess 31 is provided in the plug-and-socket connector housing 25 in the part of the housing situated above the projections 30, into which recess protrudes the end of the lug 11 and, if necessary, the projections 30 when the cap 23 closes the hollow space 17. The fluid reservoir 1 comprises an upper part 32 and a lower part 33 which parts are welded together at their rims 34.

Figure 3:
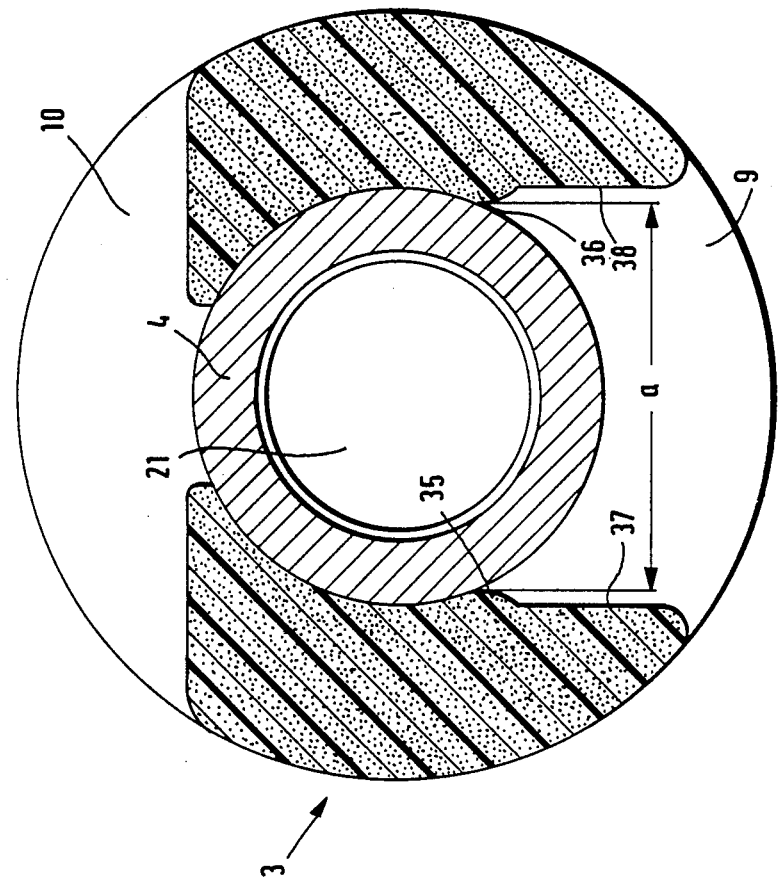
FIG. 3 is a cross sectional view taken along the line A - B in FIG. 2.
Figure 2:
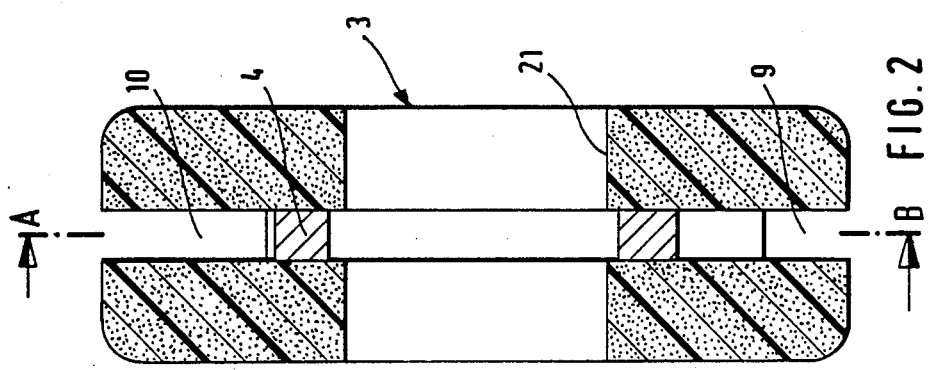
FIG. 2 is an enlarged cross sectional view of a float according to the invention.

As can be seen from FIGS. 2 and 3, the float 3 comprises an axial central bore 21 as well as a first radial recess 9 which accommodates the ring-shaped magnet 4. The opposing side walls 37, 38 of the recess 9 are provided with snap-in projections 35, 36 whose spacing "a" is smaller than the width of the recess 9 and/or the diameter of the magnet 4. When assembling the magnet 4 and/or inserting it into the recess 9, the snap-in projections 35, 36 are deformed elastically and/or pressed apart and then return into their intial position with the installed magnet 4 thus being surrounded in a form-fit manner and secured against falling out. Finally, the float 3 is provided with a second recess 10 arranged opposite the first recess 9 by means of which the weight loss caused in connection with the first recess 9 is compensated for this guarantees an exact horizontal floating position of the float 3 when the device according to the invention is in operation.

What is claimed is:

1. A device for indicating the filling level in a fluid reservoir in a vehicular hydraulic brake system, comprising a guide tube extending into the fluid reservoir, alongside of which guide tube a float is displaceably arranged, said float including at least one magnet by means of which at least one reed switch arranged inside the guide tube is actuatable when the float reaches a predetermined position, said reed switch being connected by at least one electric wire extending from the interior of the guide tube to at least one plug-and-socket connector contact arranged in a cap, wherein the magnet is arranged in a first radial recess in the float, said first radial recess forming side walls, said side walls including retaining means for securing the magnet in an installed position on said float, wherein the retaining means are shaped in the form of elastically deformable snap-in projections formed at the side walls of the first radial recess.

2. The device according to claim 1, wherein the snap-in projections are arranged at a spacing from each other, said spacing being smaller than the width of the first radial recess and the diameter of the magnet.

3. The device according to claim 1, wherein the float is provided with a second radial recess located opposite the first radial recess.

4. The device according to claim 1, wherein the float comprises a formed plastic element.

5. The device according to claim 1, wherein the float comprises a hollow element.

* * * * *